US012145159B2

(12) United States Patent
Walker

(10) Patent No.: US 12,145,159 B2
(45) Date of Patent: Nov. 19, 2024

(54) FLOTATION MACHINE APPARATUS AND METHOD OF USING THE SAME

(71) Applicant: FLSmidth A/S, Valby (DK)

(72) Inventor: Mathew Walker, Brisbane (AU)

(73) Assignee: FLSmidth A/S (DK)

( * ) Notice: Subject to any disclaimer, the term of this patent is extended or adjusted under 35 U.S.C. 154(b) by 928 days.

(21) Appl. No.: 17/040,852

(22) PCT Filed: Mar. 22, 2019

(86) PCT No.: PCT/IB2019/052361

§ 371 (c)(1),
(2) Date: Sep. 23, 2020

(87) PCT Pub. No.: WO2019/180682

PCT Pub. Date: Sep. 26, 2019

(65) Prior Publication Data

US 2021/0016294 A1 Jan. 21, 2021

Related U.S. Application Data

(60) Provisional application No. 62/646,967, filed on Mar. 23, 2018.

(51) Int. Cl.
*B03D 1/14* (2006.01)
*B03D 1/16* (2006.01)
(Continued)

(52) U.S. Cl.
CPC ............. *B03D 1/1443* (2013.01); *B03D 1/16* (2013.01); *B05B 15/528* (2018.02); *B05B 15/55* (2018.02)

(58) Field of Classification Search
CPC .... B03D 1/1433; B03D 1/082; B05B 15/528; B05B 15/55; B05B 1/185
See application file for complete search history.

(56) References Cited

U.S. PATENT DOCUMENTS 5,039,400 A 8/1991 Kallioinen
5,049,320 A * 9/1991 Wang .................. B01F 23/2322 261/122.1

(Continued)

FOREIGN PATENT DOCUMENTS

AU 674981 B2 * 1/1997
AU 8195498 A * 8/1997

(Continued)

OTHER PUBLICATIONS

The International Search Report and Written Opinion dated Aug. 13, 2019, 9 pages.

*Primary Examiner* — Patrick Orme
(74) *Attorney, Agent, or Firm* — Jeffrey A. Sharp

(57) ABSTRACT

A flotation machine includes a wash water system that is connectable adjacent a tank to direct sprays of water into froth within a froth zone. Wash water panel assemblies of the system can be positioned adjacent the tank so that each of the wash water panel assemblies are moveable between an open position and a closed position. Each wash water panel assembly can include an outer panel body that at least partially defines a reservoir in which wash water is passable and a spray membrane positionable adjacent the outer panel body. The spray membrane can have a plurality of spray holes in fluid communication with the reservoir such that water is passable from the reservoir and through the spray membrane via the spray holes for spraying water into the froth in the froth zone.

15 Claims, 9 Drawing Sheets

(51) Int. Cl.
*B05B 15/528* (2018.01)
*B05B 15/55* (2018.01)

(56) References Cited

U.S. PATENT DOCUMENTS

| | | | |
|---|---|---|---|
| 2003/0106843 | A1 | 6/2003 | Jameson et al. |
| 2004/0099575 | A1 | 5/2004 | Khan et al. |

FOREIGN PATENT DOCUMENTS

| | | | | |
|---|---|---|---|---|
| CN | 203725272 | U | * | 7/2014 |
| CN | 105478260 | A | | 4/2016 |
| CN | 105999930 | A | * | 10/2016 |
| DE | 3107808 | A1 | | 9/1982 |
| EP | 1700636 | A2 | | 9/2006 |

* cited by examiner

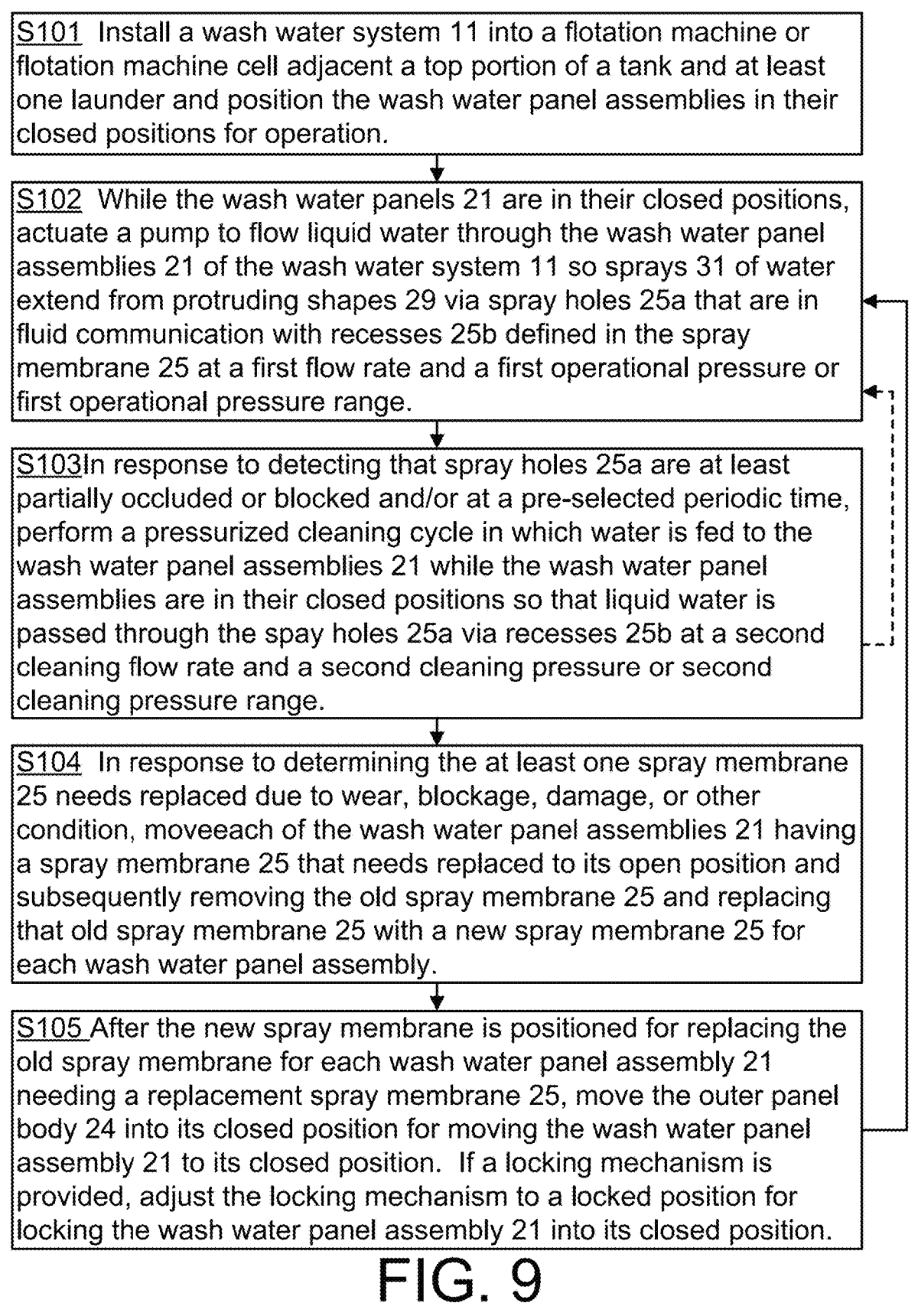

S101 Install a wash water system 11 into a flotation machine or flotation machine cell adjacent a top portion of a tank and at least one launder and position the wash water panel assemblies in their closed positions for operation.

S102 While the wash water panels 21 are in their closed positions, actuate a pump to flow liquid water through the wash water panel assemblies 21 of the wash water system 11 so sprays 31 of water extend from protruding shapes 29 via spray holes 25a that are in fluid communication with recesses 25b defined in the spray membrane 25 at a first flow rate and a first operational pressure or first operational pressure range.

S103In response to detecting that spray holes 25a are at least partially occluded or blocked and/or at a pre-selected periodic time, perform a pressurized cleaning cycle in which water is fed to the wash water panel assemblies 21 while the wash water panel assemblies are in their closed positions so that liquid water is passed through the spay holes 25a via recesses 25b at a second cleaning flow rate and a second cleaning pressure or second cleaning pressure range.

S104 In response to determining the at least one spray membrane 25 needs replaced due to wear, blockage, damage, or other condition, moveeach of the wash water panel assemblies 21 having a spray membrane 25 that needs replaced to its open position and subsequently removing the old spray membrane 25 and replacing that old spray membrane 25 with a new spray membrane 25 for each wash water panel assembly.

S105 After the new spray membrane is positioned for replacing the old spray membrane for each wash water panel assembly 21 needing a replacement spray membrane 25, move the outer panel body 24 into its closed position for moving the wash water panel assembly 21 to its closed position. If a locking mechanism is provided, adjust the locking mechanism to a locked position for locking the wash water panel assembly 21 into its closed position.

FIG. 9

FLOTATION MACHINE APPARATUS AND METHOD OF USING THE SAME

FIELD OF INVENTION

The present invention relates to flotation machines. More particularly, the present invention relates to flotation machines, wash water systems that may be used in flotation machines and methods of using flotation machines and methods of retrofitting flotation machines to include a wash water system.

BACKGROUND OF THE INVENTION

Flotation machines are typically configured to retain a slurry, or pulp, within a tank. The slurry may include a material that is desired to be extracted from finely sized particles within the liquid of the slurry. The flotation machines are used to separate valuable material such as minerals from material having little or no value by means of changes in the surface chemistry of solid particles in a slurry so that certain particles become hydrophobic or hydrophilic. Examples of flotation machines may be appreciated from U.S. Patent Application Publication Nos. 2015/0251192, 2014/0326643, 2009/0145821 and 2004/0188896, U.S. Pat. Nos. 9,649,640, 9,238,231, 7,441,662, 6,814,241, 6,805,243, 6,095,336, 5,947,299, 4,940,534, 4,883,603, 4,800,017, 4,425,232, 2,973,095, 2,461,584, and 2,324,018, International Publication Nos. WO 2015/114505, 2011/150455, WO 2012/090167, WO 2011/069314, WO 2011/066705, WO 2008/064406, Canadian Patent Application Publication No. CA 2 106 925, and Polish Patent No. 64101.

Often, flotation machines utilize a rotor positioned adjacent a stator. The rotor is rotated to agitate the slurry. Bubbles may be formed by agitation of the slurry and the feeding of air into the slurry to cause a froth to form above of the slurry. The hydrophobic particles will attach to the bubbles being carried to the top of the tank of the flotation cell where a froth is formed. The froth and particles suspended in the froth are collected by launders positioned adjacent to the top of the flotation cell.

In some designs, a type of gas such as air may be introduced into the slurry for the generation of bubbles and the formation of a froth. The air or other gas may be emitted so that the rotating rotor agitates the emitted gas along with the slurry to help generate a condition within the slurry to propagate the formation of froth above the slurry. U.S. Pat. No. 4,425,232 may provide one example of such a flotation machine design.

SUMMARY OF THE INVENTION

We have determined that it would be desirable to design a new flotation machine such that the flotation machine is configured to provide an improved recovery of material from retained slurry. We have determined that the improved recovery would also be preferably obtained while also reducing the cost of manufacture, the cost of maintenance, and/or the cost of operation associated with the flotation machine. In some embodiments, a wash water system can include a panel assembly that is able to facilitate concurrent, or simultaneous washing and crowding of froth generated in or on a tank of a flotation machine or a cell of such a machine.

In some arrangements, we provide a flotation machine that includes a wash water system that is connectable adjacent to a tank to direct sprays of water into froth. The wash water system can include a plurality of wash water panel assemblies positioned adjacent the tank (e.g. incorporated in a crowder or launder or otherwise positionable adjacent a launder or crowder positioned by or attached to the tank, etc.). Each of the wash water panel assemblies can be moveable between an open position and a closed position. Each of the wash water panel assemblies can include: an outer panel body that at least partially defines a reservoir in which wash water is passable and a spray membrane positionable adjacent the outer panel body. The spray membrane can have a plurality of spray holes in fluid communication with the reservoir such that water is passable from the reservoir and through the spray membrane via the spray holes for spraying water into the froth.

The spray membrane can be resilient and can be configured such that a plurality of protruding shapes are formed in the spray membrane when liquid water is passed through the spray holes for spraying water into the froth. In some embodiments, spray membrane can be comprised of an elastomeric material so that the spray holes can be enlarged in size during cleaning cycles at which water may be passed out of the spray membrane at a greater flow rate than a washing flow rate. Deformation of the spray membrane can elongate and/or widen the spray holes to facilitate the dislodgement of undesired material (e.g. scale, solids, etc.) stuck within the spray holes that at least partially occlude the spray holes so that such undesired material can be dislodged and ejected from the spray holes due to the enlargement of the spray holes. The cleaning of the spray holes can permit improved efficiency of operation and provide improved maintenance operations that can extend the life of the spray membrane.

In some embodiments, the spray membrane can have a plurality of recesses. Each of the recesses can be in fluid communication with a respective set of the spray holes. Each of the recesses can also be in fluid communication with the reservoir. Such embodiments can also include one or more metering plates. For example, each of the wash water panel assemblies can also include a metering plate positioned between the outer panel body and the spray membrane. The metering plate can have a plurality of holes in fluid communication with the reservoir. Each of the holes of the metering plate can be in fluid communication with at least one of the recesses.

In some embodiments of the flotation machine, the wash water panel assemblies can also include a metering plate positioned between the outer panel body and the spray membrane. The metering plate can be positioned between the outer panel body and the spray membrane to at least partially define the reservoir, The metering plate can have a plurality of holes in fluid communication with the reservoir. Each of the holes of the metering plate can also be in fluid communication with at least one of the spray holes.

In some embodiments, there can also be at least one wash water member positioned to contact the spray membrane of at least one of the wash water panel assemblies when that at least one wash water panel assembly is in a closed position. The at least one wash water member can have holes that are aligned with the spray holes so that the protruding shapes can extend into the holes of the at least one wash water member. In some embodiments, the wash water member can be a rigid plate (e.g. a plate made of steel or other metal) that is more rigid than the spray membrane.

A plurality of connectors that moveably connect the wash water panel assemblies to at least one of the tank and a housing of the flotation machine can also be included in embodiments of the floatation machine. Such connectors can be provided such that each of the wash water panel assemblies is moveable between a closed position and an open position. In some embodiments, the connectors can be configured as hinges or moveably connector mechanism to facilitate such movement between the closed and open positions. In some embodiments, at least one wash water member can be positioned to contact the spray membrane of at least one of the wash water panel assemblies when that at least one wash water panel assembly is in the closed position. The at least one wash water member can have holes that are aligned with the spray holes so that protruding shapes that can be formed in the spray membrane when liquid water is passed through the spray holes can extend into the holes of the at least one wash water member.

A method of operating a flotation machine is also provided. Embodiments of the method can include providing a wash water system for installation into a flotation machine adjacent a top portion of a tank for directing sprays of liquid water into a froth zone of froth formed in the tank. In some embodiments, such positioning can include positioning the wash water panel assemblies of the wash water system within a radial lauder or a radial crowder of a flotation machine. In other embodiments, such positioning can locate the wash water panels near such elements or otherwise adjacent a top portion of the tank so that wash water can be directed into the froth zone at a desired flow rate. Embodiments of the method can also include moving wash water panel assemblies between closed positions and open positions to replace spray membranes of wash water panel assemblies of the wash water system and/or feeding water into wash water panel assemblies of the wash water system so that spray membranes of the wash water panel assemblies having spray holes form protruding shapes as water is sprayed out of the spray holes and into the froth zone to detach undesired material bonded to bubbles of the froth within the froth zone.

In some embodiments of the method, the moving the wash water panel assemblies between the closed positions and the open positions to replace spray membranes of wash water panel assemblies of the wash water system can be performed and the wash water panel assemblies can also be moved from the open positions to the closed positions after old spray membranes are removed and replacement spray membranes are positioned to replace the old spray membranes.

Embodiments of the method can also include other steps. For instance, embodiments of the method can also include performing at least one cleaning cycle such that water is passed out of the spray holes of the spray membranes at a cleaning flow rate that is greater than a first flow rate at which water is passed out of the spray holes to detach undesired material bonded to bubbles of the froth within the froth zone for a preselected period of time. The cleaning flow rate of the cleaning cycle can be utilized such that the spray holes enlarge when the water is passed through the spray holes at the cleaning flow rate to facilitate dislodging of undesired material from within the spray holes, the undesired material comprising at least one of scale and solids at least partially occluding the spray holes. In some embodiments, the cleaning cycles can be autonomously operated so that the cleaning cycles are self-cleaning cycles that are controlled by a controller without the need or use of maintenance personnel to be involved in the cleaning of the spray holes. As another example, embodiments of the method can also (or alternatively) include feeding water into the wash water panel assemblies of the wash water system so that spray membranes of the wash water panel assemblies having spray holes form protruding shapes as water is sprayed out of the spray holes at a first flow rate into the froth zone to detach undesired material bonded to bubbles of the froth within the froth zone.

A panel assembly for a wash water system of a flotation machine is also provided. The panel assembly can include an outer panel body that at least partially defines a reservoir in which wash water is passable and a spray membrane positionable adjacent the outer panel body. The spray membrane can have a plurality of spray holes in fluid communication with the reservoir such that water is passable from the reservoir and through the spray membrane via the spray holes for spraying water into froth. The spray membrane can be resilient and can be configured such that a plurality of protruding shapes are formed in the spray membrane when liquid water is passed through the spray holes for spraying water into the froth. The outer panel body can be moveably attachable to at least one of a tank of the flotation machine and a housing of the flotation machine such that the outer panel body is moveable between an open position and a closed position. In some embodiments, the panel assembly can be configured to be within a lower surface of a radial launder or radial crowder so washing is performable concurrently with crowding of the froth.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred flotation machines, wash systems used therein, and a panel assembly for a wash water system are shown in the accompanying drawings and certain present preferred methods of practicing the same are also illustrated therein. It should be understood that like reference numbers used in the drawings may identify like components.

FIG. 9 is a flow chart illustrating an exemplary method of including a wash water system on a flotation machine and subsequently operating and maintaining the wash water system.

DETAILED DESCRIPTION OF EXEMPLARY EMBODIMENTS

Figure 1:
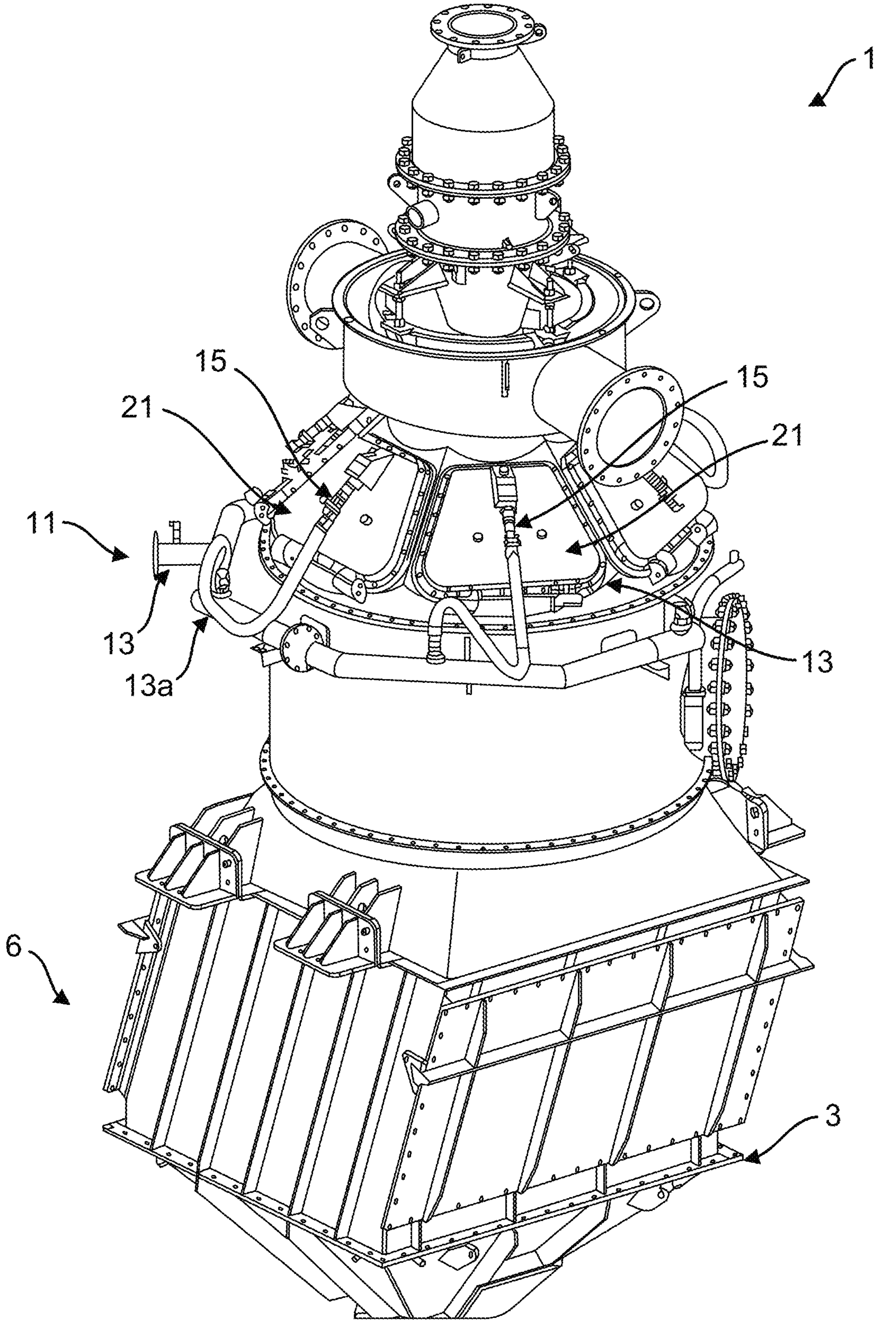
FIG. 1 is a perspective view of a first exemplary embodiment of a flotation machine.
Figure 2:
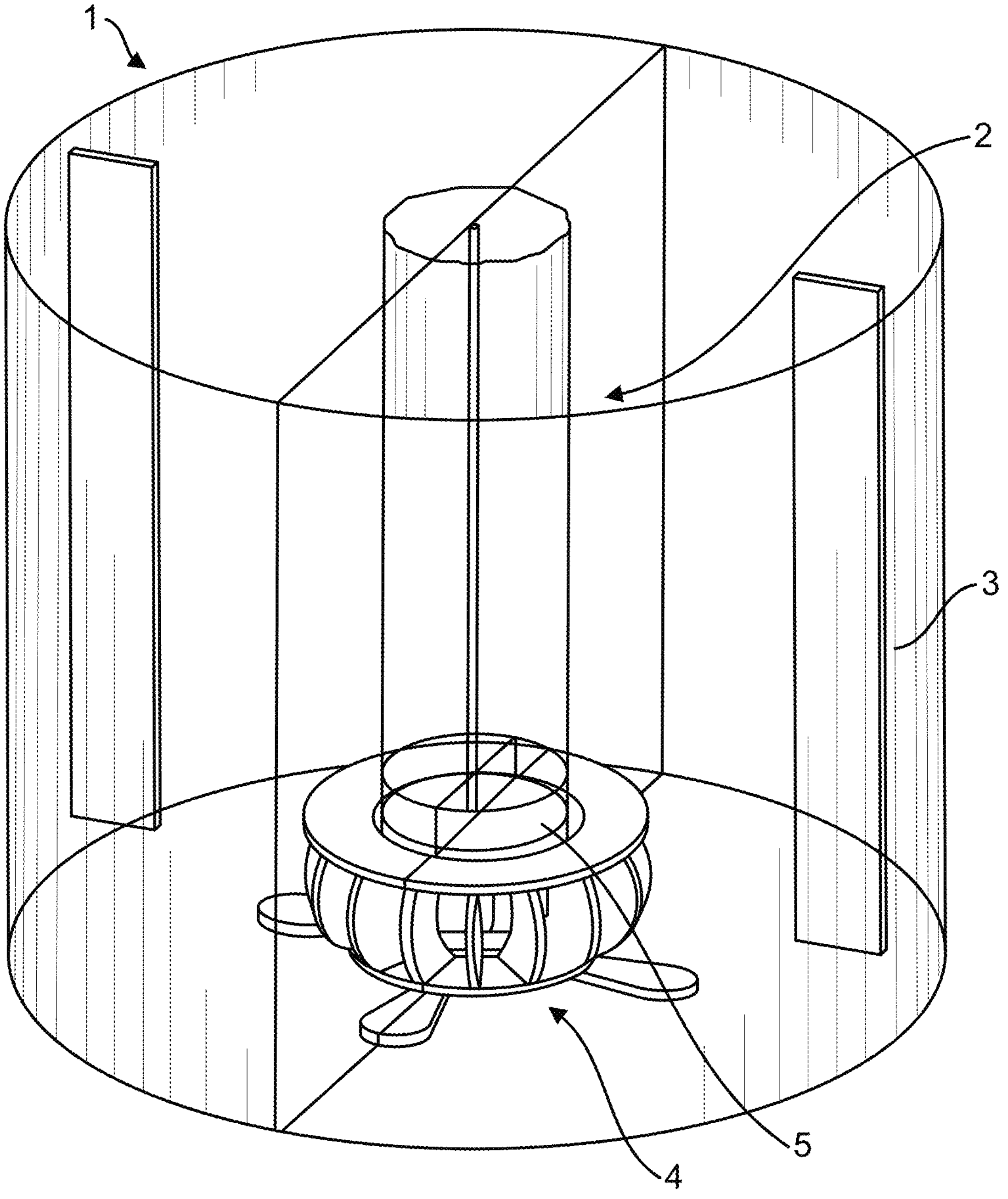
FIG. 2 is a fragmentary schematic view of the first exemplary embodiment of the flotation machine illustrating elements within the tank of the flotation machine.
Figure 3:
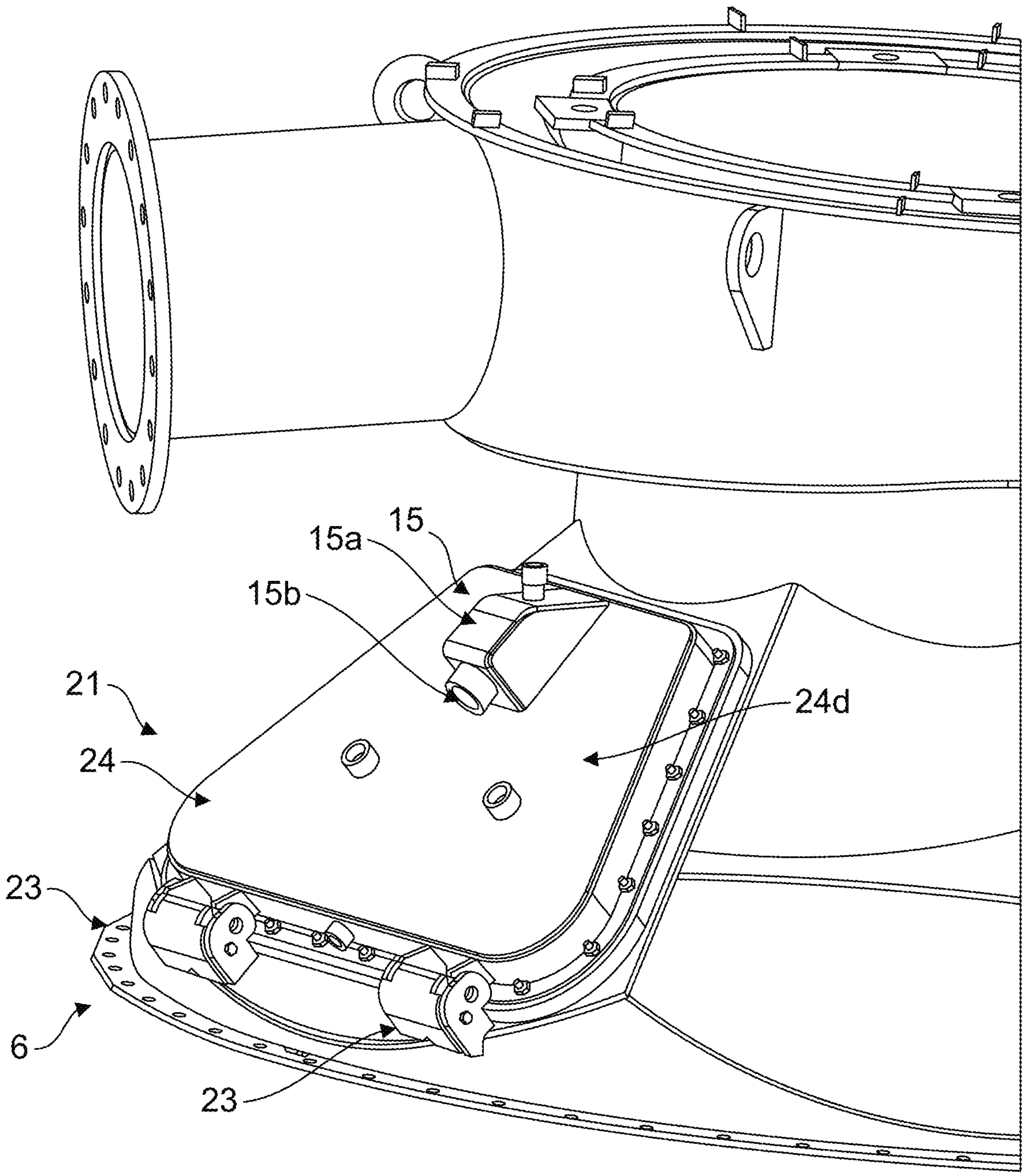
FIG. 3 is a fragmentary perspective view of the first exemplary embodiment of the flotation machine illustrating an enlarged view of a first hinged washer panel assembly of the exemplary washer system of the first exemplary embodiment of the flotation machine. In the view of FIG. 3, the panel is shown in a closed position.
Figure 4:
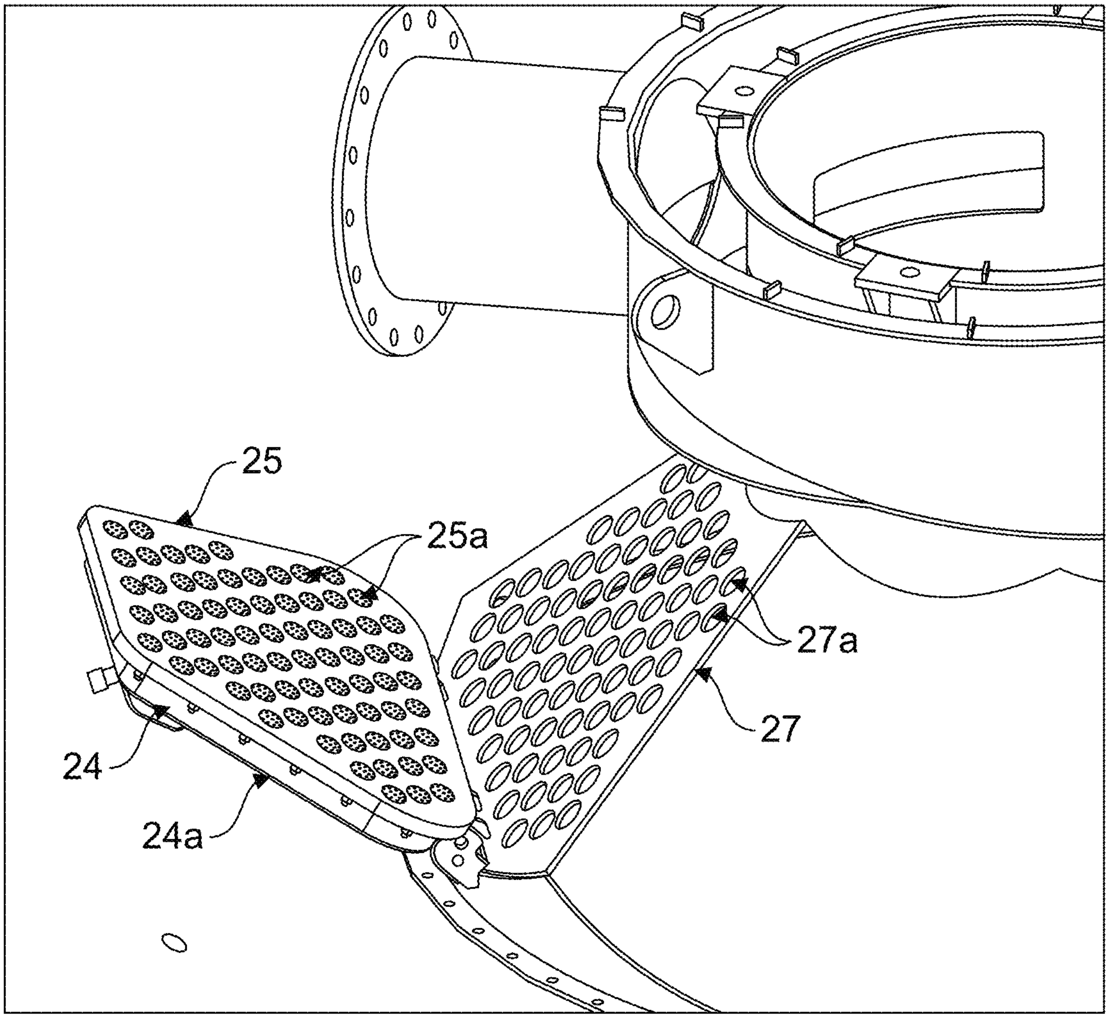
FIG. 4 is a fragmentary perspective view similar to FIG. 3 illustrating the panel moved into an open position that can be utilized for replacing one or more components of the panel.
Figure 5:
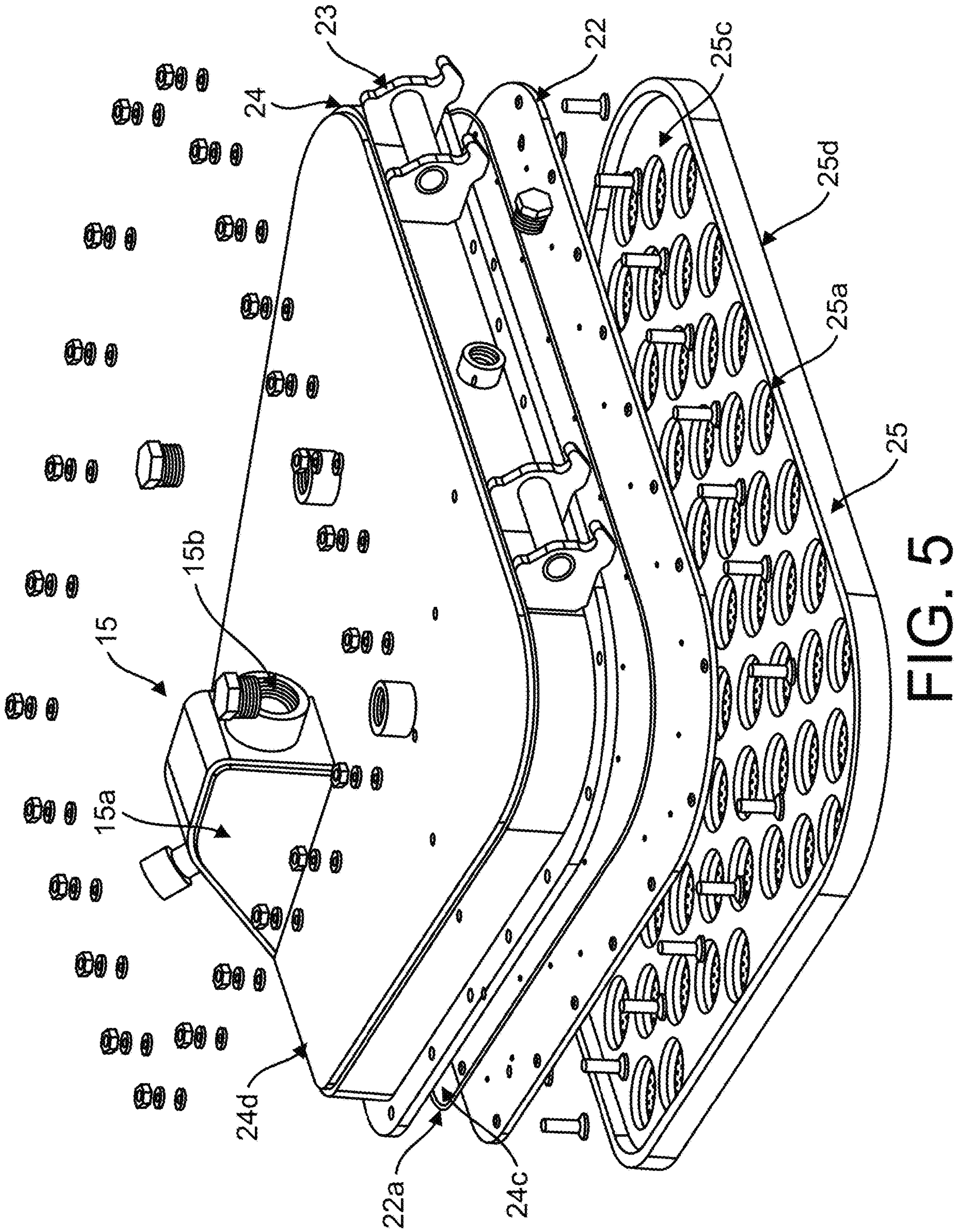
FIG. 5 is an exploded view of the first hinged washer panel assembly of the exemplary washer system of the first exemplary embodiment of the flotation machine.
Figure 6:
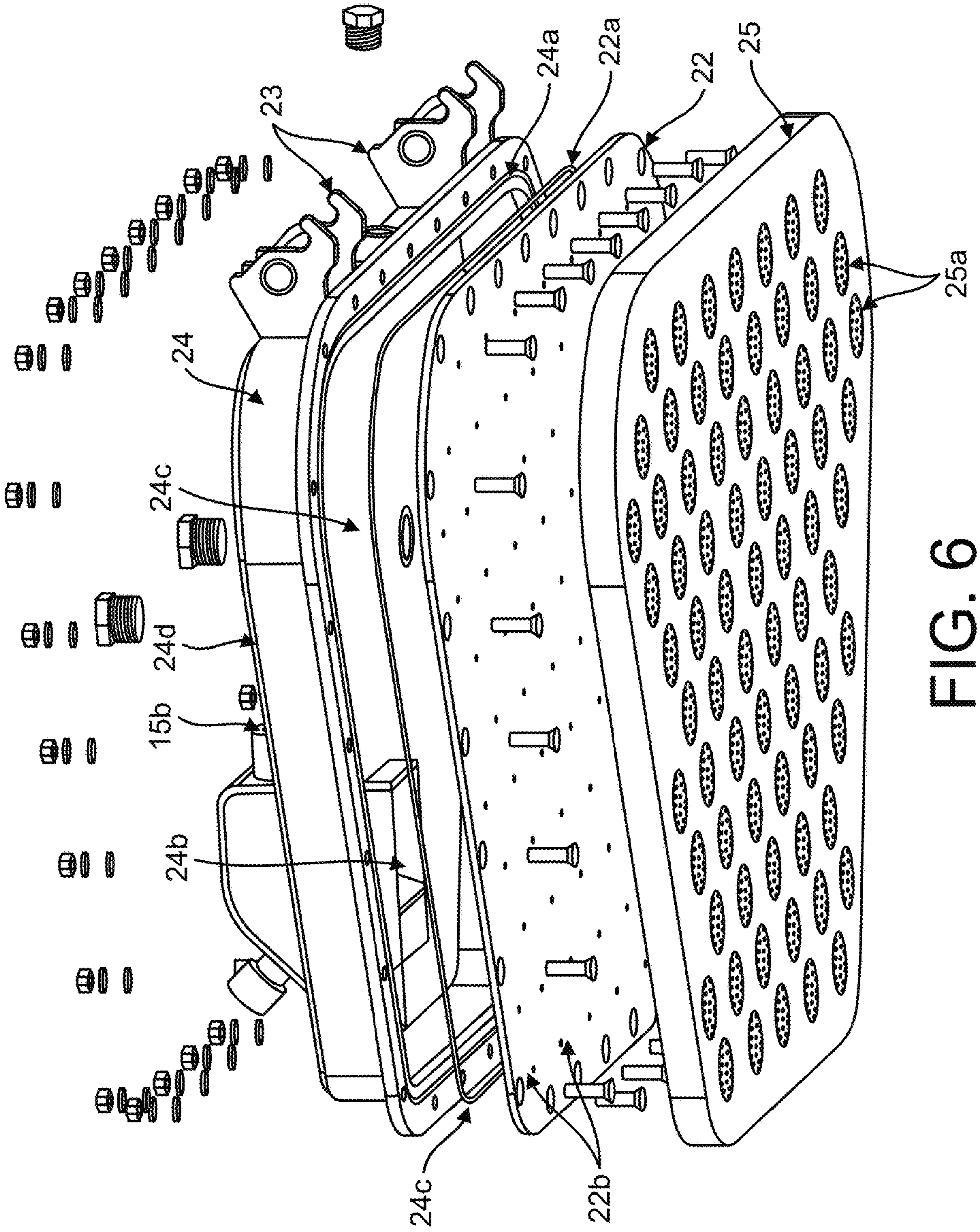
FIG. 6 is an exploded view of the first hinged washer panel assembly of the exemplary washer system of the first exemplary embodiment of the flotation machine.
Figure 7:
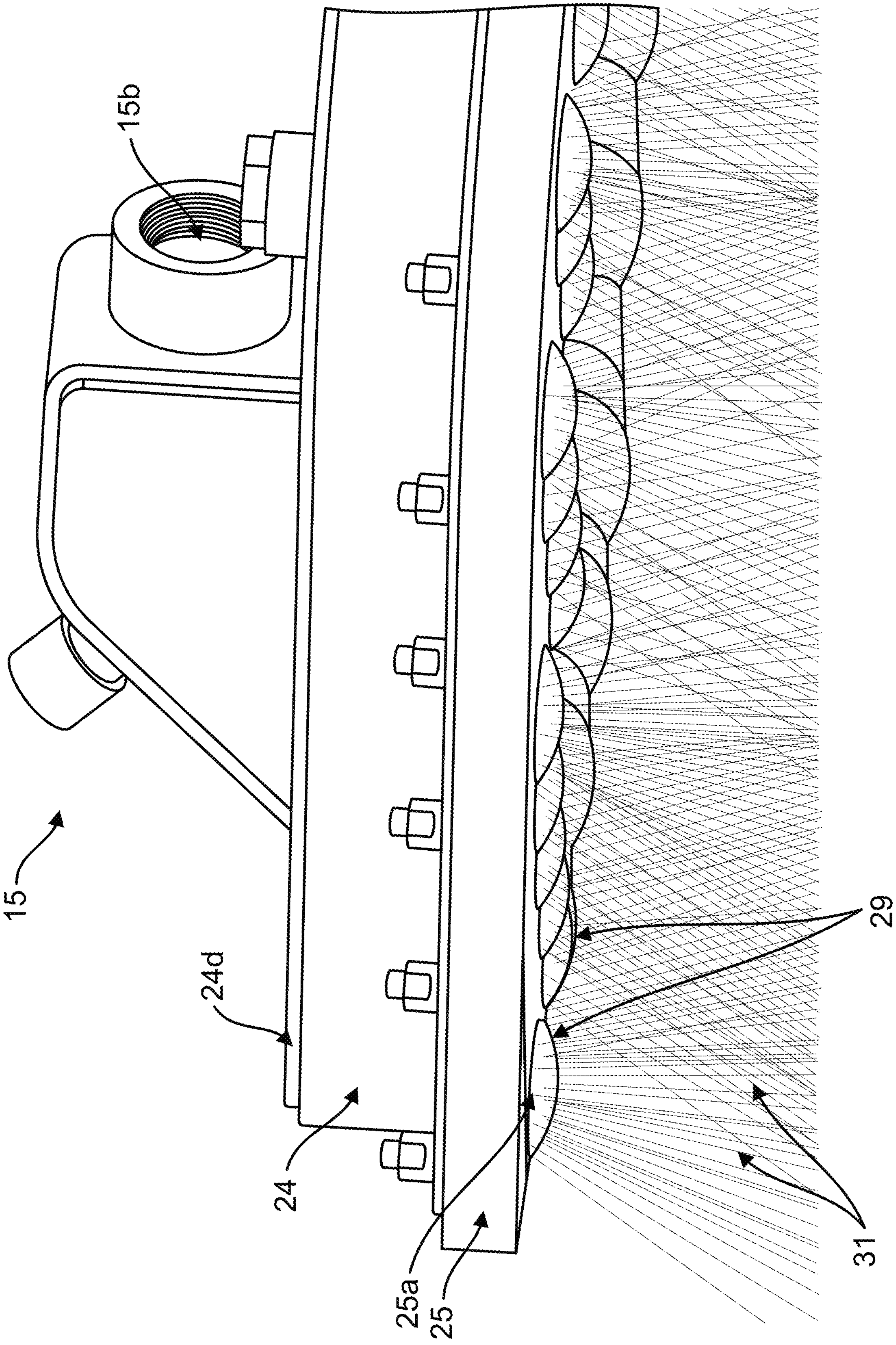
FIG. 7 is a fragmentary side view of the first hinged washer panel assembly of the exemplary washer system of the first exemplary embodiment of the flotation machine. The view of FIG. 8 illustrates water being sprayed via the panel assembly.
Figure 8:
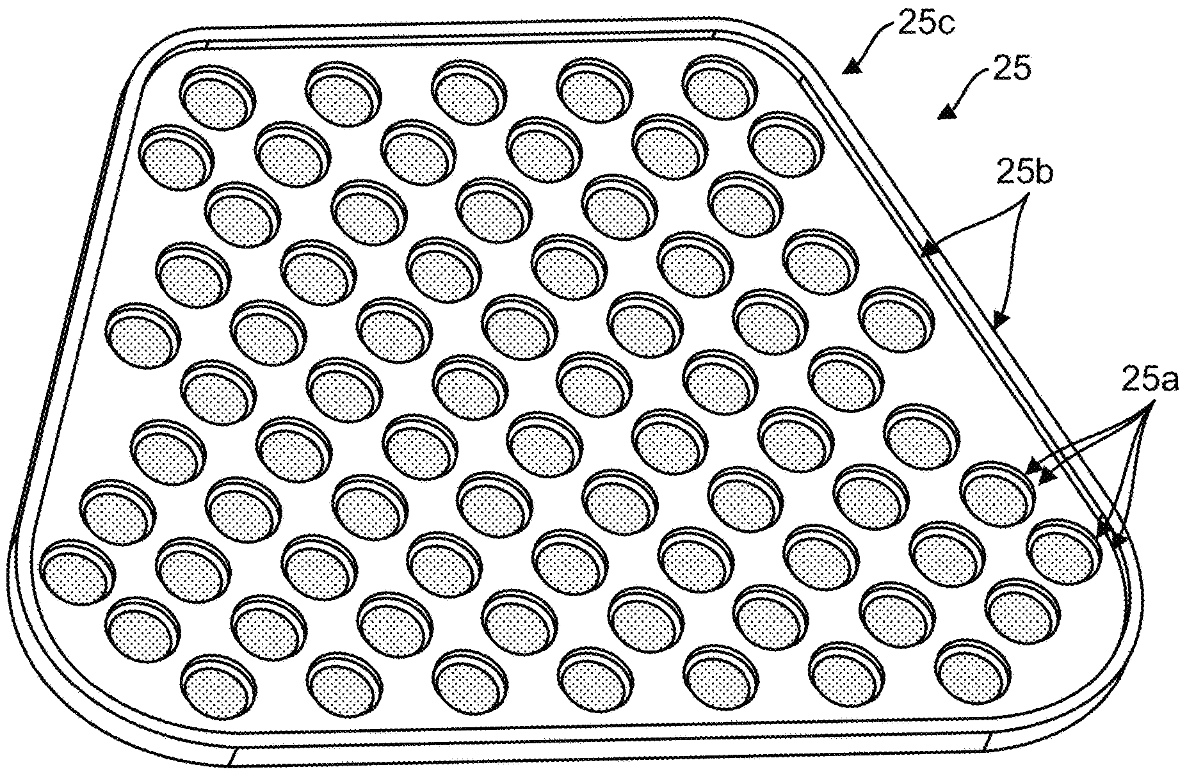
FIG. 8 is a perspective view of an exemplary elastomeric sheet element of the first hinged washer panel assembly of the exemplary washer system of the first exemplary embodiment of the flotation machine.

Referring to FIGS. 1-9, a flotation machine 1 may include an agitation mechanism 2 that may include a rotor 5 that is rotated via a drive system. The rotor 5 may have a plurality of blades and be rotated within a central opening defined by a stator 4. The stator 4 may be affixed to the floor 3 of the tank 3 or may be otherwise positioned in the tank 3 such that the rotor 5 is rotatable relative to the stator 4 to agitate slurry retained in the tank 3. The rotor 5 may also dissipate the air or other type of gas that is introduced into the tank via one or more apertures formed in the rotor 5, stator 4 or both the stator and rotor. For such embodiments, the drive system to which the rotor 5 is attached can include a conduit through which gas is passable for feeding into the tank 3 via apertures formed in the rotor and/or stator. Examples of stators 4 and rotors 5 that can be utilized in embodiments of the flotation machine 1 can be appreciated from U.S. Pat. App. Pub. Nos. 2015/0251192 and 2015/0151309.

In some embodiments that utilize a rotor 5, the rotor 5 may have an inner passageway and orifices to receive a gas such as air passed through a drive shaft or other conduit for emitting air within the slurry retained in the tank. The emitted air may then be agitated by the rotation of the rotor, which rotates the blades of the rotor. Air may also be fed to passageways formed in the stator and emitted out one or more orifices formed in the stator. For instance, a passageway for feeding the air or other gas may be defined within vanes and other parts of the stator 4 to convey the air from a conduit used to distribute the air to the stator 4 for emitting air or another gas into the tank.

In yet other embodiments, the agitation mechanism 2 may be configured to only emit air or another type of gas into the slurry within the tank to form bubbles within the slurry for agitation of the slurry such that a rotor 5 is not used or is not needed. Such embodiments can utilize a column through which a gas is fed into the tank to aerate the slurry retained in the tank to form a froth in the slurry. Such a column can include at least one conduit that extends into the tank through which a gas is fed into the tank 3 (e.g. via a fan or pump). Such embodiments can also include a stator 4 while not including a moveable rotor.

For all such embodiments, the tank 3 can retain the slurry, or pulp, which may include a liquid along with solid particulates that contain a desired material (e.g. a desired mineral or ore) to which an operator of the flotation machine may want to extract or recover. The agitation of the slurry via the rotor and/or the passing of gas into the slurry can be configured to generate bubbles for forming a froth above the slurry. The bubbles that are generated by the agitation caused by the rotating rotor and/or air emitted into the slurry may attach to hydrophobic particles within the slurry. The bubbles may carry those attached particles to a froth zone formed on the top of the floatation machine located above the slurry so that the particulates may be recovered from the slurry such as via one or more launders or other types of particulate extraction devices, particulate removal devices, or froth extraction devices positioned adjacent to the tank.

The flotation machine 1 may include one cell having just one tank or may include a plurality of cells defined by a plurality of tanks. In some embodiments, each of the cells of the flotation machine can include a tank, a non-mechanical aeration mechanism that can include a column that is configured to feed air or other gas into the tank to generate a froth in the slurry retained in the tank.

In other embodiments, at least some (or all) of the cells of a floatation machine will each include a tank 3, a rotor 5, a drive system for rotating the rotor 5, and a stator 4. The drive system on such embodiments can include a column that is configured to feed air or other gas into the slurry to help form the froth.

The flotation machine 1 (and/or each cell of a flotation machine having multiple cells), can include a wash water system 11 that is configured to spray water into the bubbles via one or more wash water panel assemblies 21 to help improve material collection of a desired material. A water feed conduit 13 can be connected between a source of water and the wash water panel assemblies 21 so that water is feedable to the panel assemblies for forming sprays 31 of liquid water to be directed into the bubbles adjacent a top portion of the tank 3. A pump can be connected to the water feed conduit 13 to help drive water through the water feed conduit 13 to the wash water panel assemblies 21 connected to a housing of the flotation machine 1 adjacent the tank 3 of the flotation machine 1 to facilitate such spraying.

The sprays 31 of the liquid water can be directed at the froth to cause weakly hydrophobic particles that are undesired (e.g. gangue, waste rock or undesired vein matter) to be knocked off or detached from the bubbles of the froth as such undesired material can have weaker bonds to the bubbles of the froth than the desired mineral or ore to be recovered via the froth. The wash water panel assemblies 21 can be positioned so that the sprays 31 of the liquid water are emitted directly into the froth zone of the froth in the tank 3 instead of above the froth zone. Such positioning can help avoid the wash water being sprayed at an excessive momentum. Avoiding such excessive momentum can help avoid detachment of targeted particles bonded to the bubbles of the front that are desired to be recovered by the flotation machine (e.g. a desired mineral or ore, etc.) so that only undesired material are detached from the bubbles in the froth zone. Such removal of undesired material from the bubbles allows the undesired material to be returned to the slurry within the tank while retaining desired material within the froth so that the desired material can be output into launders via the froth without any (or with a lesser amount) of undesired material. This can allow recovery operations to proceed at a higher efficiency as more desired material can be separated from undesired material via the flotation machine for further collection and refinement operations, which can also occur at an improved efficiency as the undesired material is more effectively separated from the desired material via the froth generated in the flotation machine 1 for recovery of the desired material (e.g. a mineral or ore such as copper, cobalt, gold, lead, silver, zinc, etc.).

Each wash water panel assembly 21 can be connected to the wash water feed conduit 13 by a respective wash water panel feed conduit 13*a* that is connected to another portion of the wash water feed conduit 13 to receive water for outputting from that panel. The number of wash water panel assemblies 21 can vary in number to meet a particular set of design criteria. For example, embodiments can have two, three, four, five, six, seven, eight, nine, ten or other number of wash water panel assemblies 21. In yet other embodiments, there may only be a single panel or more than ten wash water panel assemblies 21. Such embodiments can utilize a number of different configurations so that water is feedable from a water source to the wash water panel assemblies. For instance, the number of pumps used to drive the flow of water to the wash water panel assemblies, the number of wash water panel feed conduits 13*a*, and the configuration of the water feed conduit 13 can vary to meet a particular set of design criteria and the number of wash water panel assemblies utilized in a particular embodiment.

A controller can be connected to the pump and/or the wash water panel assemblies to control the operation of the wash water panel assemblies. One or more sensors can also be connected to the wash water panel assemblies for measuring one or more parameters associated with operation of the wash water panel assemblies. The data collected by the one or more sensors can be communicatively provided to the controller for use in monitoring operations and/or controlling operations of the wash water panel assemblies. It should be appreciated that the controller can be a computer device that includes hardware such as, for example, at least one processor, at least one transceiver unit, and non-transitory memory. Each sensor can be, for example, flow sensor, pressure sensor, or other type of sensor (e.g. a temperature sensor, etc.). In some embodiments, some sensors can be connected to the wash water feed conduit 13 while others may be connected to particular components of a wash water panel assembly. The controller can also be configured to communicate data to an operator computer device via a network or other type of communicative connection to facilitate the display of data related to operations of the flotation machine and/or wash water panel assemblies 21 via a display device of the operator computer device. In yet other embodiments, the controller can be connected to a display device (e.g. a monitor, a liquid crystal display, etc.) to display data related to operations of the flotation machine and/or wash water panel assemblies 21.

Each wash water panel assembly 21 can include a number of components as can be appreciated from the exemplary panel assembly shown in FIGS. 3-9. For example, each wash water panel assembly 21 can include an outer water feed conduit connector mechanism 15 that is configured to connect the respective wash water panel feed conduit 13*a* to the wash water panel assembly 21 so that liquid water is feedable into the wash water panel assembly 21 for outputting in sprays 31 of water to be directed to a froth region that is to be formed from slurry retained in the tank 3 adjacent the top portion of the tank 3. The outer water feed conduit connector mechanism 15 can include an outer body 15*a* connected to an outer panel body 24. The water feed conduit connector mechanism 15 outer body 15*a* can be formed as an integral component of the outer panel body 24 or can be fastened and/or otherwise attached (e.g. welded, fastened via fasteners and welded, etc.) to the outer side of the outer panel body 24. The outer body 15*a* can define a water channel 15*b* that is in fluid communication with a reservoir 24*b* that is at least partially defined by the inner side 24*c* of the outer panel body 24 that is opposite the outer side 24*d* of the outer panel body 24. The water channel 15*b* can be defined in the outer body 15*a* of the outer water feed conduit connector mechanism 15 so that liquid water received from the wash water panel feed conduit 13*a* can be passed into the reservoir 24*b* and subsequently passed out of spray holes 25*a* of a spray membrane 25 and directed to froth positioned adjacent a top of the tank 3.

The outer panel body 24 can be moveably connected to the housing 6 of the flotation machine 1 and/or the tank 3 via connectors 23. The connectors 23 can be configured as hinges or other type of pivotal connection mechanism. The connectors 23 can alternatively be configured as another type of moveable connection mechanism that is configured to allow the outer panel body to be moved from a closed position such as the exemplary closed position shown in FIG. 3 to an open position, such as the open position shown in FIG. 4. A portion of each connector 23 can be formed on the outer panel body 24 or can be otherwise attached to the outer panel body 24 and be configured to pivotally connect to connector structure attached to the tank 3 and/or housing 6. For instance, the outer panel body 24 can have arms connected thereto configured to be connected to and rotate about elongated axle members attached to the housing 6 and/or the tank 3 so the outer panel body 24 is rotatable relative to the tank 3 and/or housing 6 between the open and closed positions. As another example, the outer panel body 24 can have spaced apart axle members defined thereon that are configured to receive arms extending from the housing 6 and/or tank 3 so that the panel is rotatable relative to the tank 3 and/or housing 6 between open and closed positions.

The connectors 23 can be configured to connect each outer panel body 24 to position each wash water panel assembly adjacent a launder, a radial crowder or a radial finger of the flotation machine 1 near one or more tapered upper wall sections of the tank 3 at which the froth can flow over and into a launder. In some embodiments, this adjacent positioning can be provided by incorporating the wash water panel assembly in a lower surface and/or a bottom surface of a radial crowder or a radial launder so that crowding and washing can occur at the same time. The positioning of the wash water panel assembly can be provided so that water sprayed from each wash water panel assembly 24 contacts the froth near a launder that may receive the froth.

Each wash water panel assembly 21 can also include a spray membrane 25 and a metering plate 22 between the spray membrane 25 and the outer panel body 24. In other embodiments, the metering plate 22 can be an integral part of the outer panel body 24 that helps define the reservoir 24*b*. The metering plate can be a member that has a polygonal shape, an irregular shape, circular shape, oval shape, or other type of shape that is configured to help define the reservoir 24*b*. The metering plate can also have holes 22*b*. Each of the holes 22*b* of the metering plate can be in fluid communication with the reservoir 24*b* and can be in fluid communication with at least one of the recesses 25*b* and/or spray holes 25*a* of the spray membrane 25 so that liquid water fed into the reservoir 24*b* via the water channel 15*b* of the outer water feed conduit connector mechanism 15 can pass out of the reservoir 24*b* and through spray holes 25*a* defined in the spray membrane 25. The spray holes 25*a* can be positioned in communication with spray membrane recesses 25*b* defined in the inner side 25*c* of the membrane that define a space inside the thickness T of the spray membrane 25. The spray holes 25*a* can extend from the inner side 25*c* of the spray membrane 25 to an outer side 25*d* of the spray membrane so that water from the reservoir 24*b* passes through holes 22*b* in the metering plate and into the recesses 25*b* of the spray membrane 25 and subsequently pass from the recesses out of the spray holes 25*a* toward the froth adjacent the top portion of the tank 3 and/or a launder for the froth.

The spray membrane 25 can be comprised of a resilient material or elastomeric material and the recesses 25*b* can be defined in the spray membrane 25 so that when water is passed through the recesses 25*b* and out of the spray holes 25*a*, the shape of the outer side 25*d* of the membrane that defines the recesses 25*b* deforms so that the portions of the spray membrane 25 protrude outwardly toward the froth into a protruding shape 29. The protruding shape 29 can be configured to resemble a dome or a half-hemisphere or have another type of pre-selected geometric profile or shape. The actual geometric shape of the protruding shape 29 can be defined by a combination of the resiliency of the material of the spray membrane 25, the thickness of the spray membrane 25, the shape and size of the recess 25*b*, and the number of spray holes 25*a* in communication with the recess 25*b* through which liquid water within the recess 25*b* passes out of the recess 25*b* and through the thickness T of the spray membrane 25 for forming sprays 31 of liquid water. The protruding shapes 29 can be configured so that the water spray profile provides a desired wash water flow profile to meet a particular pre-selected or pre-determined spray profile design criteria. For instance, the dome-shaped protruding shapes can facilitate formation of a conical spray flow profile. Other types of protruding shapes that are defined in the spray membrane can facilitate formation of different types of spray flow profiles.

When water is not passed through the spray membrane 25, the spray membrane 25 may move from its deformed state having the protruding shapes 29 to a non-deformed shape or configuration in which the protruding shapes do not protrude or protrude to a less extent (e.g. return from a second protruded position to an original first position or first non-fully protruded position). This non-deformed configuration can position the spray membrane in a straight or planar arrangement that is smoother or flatter than the deformed configuration in which the protruding shapes 29 are formed via water passing through the spray holes 25*a* at a pre-selected flow rate.

The resilient or elastomeric property of the spray membrane can be provided by composing the spray membrane as polyurethane or another type of polymeric or elastomeric type of material (e.g. synthetic rubber, natural rubber, silicone, Neoprene or polychloroprene, a fluoropolymer elastomer (e.g. Viton brand elastomer etc.), MOR, etc.) The thickness T of the spray membrane 25, the number of recesses 25*b*, the size and shape of these recesses 25*b*, the configuration of the spray membrane 25 (e.g. the length, thickness, width, and geometric profile of the membrane etc.), and the number of spray holes 25*a* in fluid communication with each recess 25*b*. In some embodiments, there may be 30 0.5 mm spray holes 25*a* defined in the spray membrane 25 for being in fluid communication with each recess 25*b*.

It should be understood that the 0.5 mm spray hole size is an exemplary size and that the hole sizes can be any of a number of other suitable options (e.g. 0.2 mm holes, between 1 mm and 0.5 mm, between 0.5 mm and 5 mm, holes larger than 0.5 mm in size, etc.). The use of 30 such spray holes 25*a* is also exemplary. In other embodiments, there may be another number of such spray holes 25*a* in fluid communication with a respective recess 25*b* (e.g. less than 10, between 5 and 25, more than 30, less than 30, between 5 and 100, etc.).

Each wash water panel assemblies 21 can include seals or other mechanisms to help ensure a desired seal between different components of the assembly. For example, the metering plate 22 and the outer panel body 24 can be configured so that at least one gasket (e.g. an O-ring or O-ring type structure) can be positioned to help seal the interconnection between the outer panel body 24 and the metering plate 22 to help avoid leaks of liquid water. For instance, the metering plate 22 can be configured to engage or contact with a gasket 22*a* that may be positioned in a groove 24*a* defined in the inner side 24*c* of the outer body panel 24 such that a portion of the gasket 22*a* extends out of the groove 24*a* for contact with the metering plate 22. The gasket 22*a* can be configured as an annular gasket structure (e.g. an O-ring type structure that has a desired annular shape defining a central opening within the body of the gasket) to help seal the reservoir 24*b* defined between the metering plate 22 and the outer panel body 24 to prevent leaking or to help ensure the water flows through the holes 22*b* of the metering plate along a desired flow profile for passing out of the reservoir 24*b* and through spray holes 25*a* in fluid communication with the recesses 25*b* of the spray membrane 25.

In some embodiments, there may not be a gasket 22*a* or a need for a gasket 22*a*. For instance, in some embodiments, the entire reservoir 24*b* and spray nozzle arrangement can be defined by a single case piece composed of an elastomeric material. The elastomeric material of the single cast piece can be configured to function as its own seal in its connection to the outer panel body 24 so that a metering plate 22 and/or gasket 22*a* are not needed or utilized. Such a self-sealing function can be defined by the resiliency of the single cast member, the size and structure of that single cast structure, and how that single cast spray membrane structure is connected to the outer panel body 24.

Each wash water panel assembly 21 can be attached to the housing 6 and/or tank 3 so that the spray membrane 25 is positioned in alignment with a wash water member 27 that is attached to the housing 6 and/or tank 3 and is positioned adjacent a top portion of the tank 3. The wash water member 27 can be composed of a metal or other material that is more rigid than the spray membrane 25. The wash water member 27 can have holes 27*a* defined therein that are configured to align with respective recesses 25*b* and spray holes 25*a* of the spray membrane so that each recess 25*b* defined on the inner side of the spray membrane 25*a* is aligned with a corresponding one of the holes 27*a* of the wash water member 27. The alignment of each hole 27*a* of the wash water member 27 with a respective corresponding recess 25*b* can allow the protruding shape 29 to extend into and/or through the hole 27*a* to which the recess 25*b* defining that protruding shape is aligned. For example, each hole 27*a* in the wash water member 27 can be sized and positioned to allow the protruding shape 29 of the recess to which it is aligned to extend into the hole 27*a* of the wash water member 27 and/or through the hole 27 so that the protruding shape 29 is extendable out of the wash water member 27 through hole 27*a* and toward froth in the tank 3 for spraying water at the froth in sprays 31.

In some embodiments, the wash water member 27 can be structured to include an annular shaped body that is positioned for contacting the spray membranes 25 of all of the wash water panel assemblies 21. In yet other embodiments, there may be multiple wash water members and each wash water member 27 can be positioned and structured to contact multiple spray membranes 25 of a number of the wash water panel assemblies 21 (e.g. for an embodiment having six wash water panels, there may be two wash water members 27 positioned so that each wash water member 27 contacts three respective ones of the spray membranes 25 of the wash water panel assemblies 21, etc.). In other embodiments, there may be separate wash water members 27 positioned so that each wash water member 27 contacts a corresponding and respective spray membrane 25 of a particular wash water panel assembly 21.

In some embodiments, it is contemplated that the spray membrane 25 may not need to include recesses 25*b*. In such embodiments, the thickness T of the spray membrane and alignment of spray holes 25*a* with the rigid wash water member 27 and holes of the wash water member 27*a* can be configured to facilitate the formation of the protruding shapes through the holes 27*a* of the wash water member 27. The shape and size of such protruding shapes can be defined by the resiliency (or elasticity) of the spray membrane 25, shape of the holes 27*a* of the wash water member 27, shape and number of the spray holes 25*a*, and flow rate of the liquid water passed through the holes 25*a*. In some embodiments, the protruding shapes 29 can be so configured so that when they are formed the protruding shapes could then also provide or define formed recesses 25*b* in fluid communication with the spray holes 25*a* only while the protruding shape 29 were formed via flowing of water through the spray holes 25*a*.

In some embodiments, the outer panel body 24 can be configured to be lockingly attached to the housing 6 and/or tank 3 to lock the outer panel body 24 in the closed position to position the spray membrane 25 in tight contact with the wash water member 27 when the panel assembly 21 is in the closed position and to help prevent the outer panel body 24 from being moved away from the spray membrane 25 when water is flown through the reservoir 24*b* and out of spray holes 25*a*. For instance, the outer panel body 24 can be unlocked from its locked position via actuation of at least one lock mechanism positioned between the outer panel body 24 and the housing 6 and/or tank 3 so that the outer panel body 24*b* can be moved via connector 23 into its open position so that the spray membrane 25 can be removed and replaced with a new spray membrane 25 when needed due to wear experienced from use and operation of the wash water system 11. Once the new spray membrane is positioned on the wash water member 27 or attached to the outer panel body 24, the outer panel body 24 can be moved from its open position to its closed position and the lock mechanism can subsequently be moved back into its locked position for locking the outer panel body in its closed position.

The lock mechanism used to adjustably lock the outer panel body 24 for keeping the outer panel body 24 in its closed position can include a plurality of threaded fasteners (e.g. screws or bolts), or other type of lock mechanism (e.g. interlocking mateable structures attached between the outer panel body 24 and the housing 6 and/or tank 3). Actuation of the unlocking of the outer panel body can be provided by unscrewing fasteners and/or actuation of a release mechanism connected to one or more interlockable mateable structures to decouple the outer panel body 24 sufficiently from the housing 6 and/or tank 3 so that the outer panel body 24 is moveable via connectors 23 from the closed position to the open position and vice versa.

In some embodiments, there may not be any type of wash water member 27. For instance, the spray membrane 25 can be alternatively be attached to the metering member 22 of outer panel body 24 via a plurality of fasteners (e.g. bolts, screws, etc.) and/or other attachment mechanism so that the wash water member 27 is not needed. In yet other contemplated embodiments, such fasteners or other attachment mechanism can be used in combination with positioning the spray membrane 25 on the wash water member 27 so that recesses 25*b* align with corresponding holes 27*a* of the wash water member 27.

Conventional flotation machines 1 or cells of a flotation machine apparatus where each cell may include a flotation machine 1 can be retrofitted to include a wash water system 11. An exemplary embodiment of a method of installing such a wash water system 11 that includes steps S101, S102, S103, S104, and S105 is shown in FIG. 9. It should be appreciated that embodiments of such a method can include other steps in addition to the steps shown in the exemplary method of FIG. 9. A method of operating a maintaining a wash water system can also be appreciated from Steps 102-105 of FIG. 9. For example, the wash water system 11 can be configured to that water is flown through the spray holes 25*a* in sprays 31 so that sprays 31 of liquid water pass out of protruding shapes 29 defined in the spray membrane 25 at a first flow rate (or first flow rate range) and a first operational pressure or first operational pressure range toward froth formed in the tank 3 or adjacent a top of the tank near a launder or crowder. The first flow rate range can be, for example, a flow rate of 0.02-0.5 L/min (e.g. a 0.1 L/min rate, a 0.2 L/min rate, between a 0.05-0.25 L/min rate, etc.) and the first operational pressure range can be a pressure range of 4-30 kilopascal gauge (kPa(g)) (e.g. 6 kPa(g), 4-10 kPa(g), etc.). A first operational pressure can be a pressure within a first operational pressure range and a first flow rate can be within the first flow rate range.

It should be understood that other flow rate ranges or operational pressure ranges can be used for different embodiments to meet a particular set of design criteria. The first operational flow rate and first operational pressure (or pressure range) can be selected so that the flow rate for the liquid water sprays 31 directed into the froth zone of the froth formed in and adjacent the top portion of the tank detach undesired materials bonded to the bubbles of the froth that have weaker bonds to the bubbles than the bonds the desired materials transported via the bubbles have. The operational flow rate can be selected to minimize detachment of desired material from the bubbles within the froth while attempting to maximized detachment of the undesired material (e.g. gangue, etc.) to provide a more efficient collection of desired material and separation of the desired material form the undesired material. The operational flow rate (or range) and/or operational pressure rate (or range) that is selected can also be selected to ensure that the momentum of the spray is not sufficient to cause bubble breakage or bubble coalescence.

As the wash water system 11 is used, the spray holes 25*a* and/or recesses 25*b* can become blocked due to undesired material (e.g. calcination, scale, particulate accumulation within the spray holes 25*a*) or other type of blockage event occurring (e.g. undesired material at least partially occluding the spray holes 25*a*, etc.). Upon a detection of such occlusion a cleaning operation can be performed (e.g. exemplary step S103). For instance, the pump can be actuated to cause liquid water to flow through the wash water panel assemblies 21 via the wash water conduit 13 at a higher second cleaning flow rate and higher second cleaning pressure range or second cleaning pressure. The second cleaning flow rate (or flow rate range) can be greater than the first operational flow rate (or flow rate range) and the second cleaning operational pressure (or pressure range) can be greater than the first operational pressure (or pressure range). The second cleaning flow rate range can be, for example, a flow rate of 0.2 L/min to 0.8 L/min (e.g. a flow rate of 0.3 L/min, a flow rate of between 0.3 L/min and 0.6 L/min, etc.) and the second cleaning pressure range can be a pressure range of 20-50 kPa(g) (e.g. 25 kPa(g) 20-30 kPa(g), etc.). Of course, a second cleaning pressure can be a pressure within the second cleaning pressure range and the cleaning flow rate that is used can be a cleaning flow rate within the cleaning flow rate range. Also, it should be understood that other cleaning flow rate ranges or cleaning pressure ranges can be used for different embodiments to meet a particular set of design criteria.

The cleaning cycle can be configured so that the liquid water is pulsed at the second cleaning flow rate. For example, the pump can be controlled so that the liquid water is pulsed at the second cleaning flow rate for a number of pre-selected durations (e.g. 2 different pules in sequence in which the cleaning flow rate is applied for a pre-selected pulse time range and each successive cleaning flow rate pulse is separated by a pre-selected duration time period at which the flow rate of the liquid water is reduced below the second cleaning flow rate for that pre-selected duration). The number of pulses at which the second cleaning flow rate is utilized can vary to meet a particular set of design criteria. The pulsing can be utilized to try and dislodge at least some blockage from spray holes 25*a* or to try and break-up and subsequently dislodge such blockage elements. In alternative embodiments, instead of pulsing of the second cleaning flow rate multiple times for a particular cleaning cycle, the higher second cleaning flow rate can be applied for a continuous cleaning time period for a cleaning cycle. In some embodiments, the spray membrane 25 can be configured so that operation at the higher second cleaning flow rate and/or second cleaning pressure can allow the spray holes 25*a* to open to a larger size to allow scale, solids, etc. to be forced out of the spray holes 25*a* and/or recess 25*b* to which the spray holes 25*a* are in fluid communication (e.g. the spray holes 25*a* expand from a first diameter or width to a larger second diameter or width when water is flown out of the spry hole at the second cleaning flow rate. The second diameter or width can be larger than the diameter or width of the spray hole when water is passed through the spray hole at the first operational flow rate). The ability of the spray holes 25*a* to extend to a larger size can be at least partially defined by the size and configuration of the spray holes 25*a* and the material properties of the spray membrane 25. After the cleaning cycle is complete, the wash water system 11 may again be operated so that water flows at the first operational flow rate and first operational pressure range (e.g. as indicated for example by broken line from step S103 to step S102 in FIG. 9).

Such cleaning cycles can be autonomously controlled via a controller or other computer device so that the cleaning process can be a self-cleaning process. For instance, cleaning cycles can be self-cleaning cycles that are controlled by a controller that may control pump operations for adjusting the water flow rate between a spray flow rate and cleaning flow rate without the need or use of maintenance personnel to be involved in the cleaning of the spray holes. Such self-cleaning can occur at regular intervals or upon a detection of at least one partially occluded spray hole via data collected by one or more sensors.

If the spray membrane for at least one wash water panel assembly 21 is determined to need replacement (e.g. as indicated in step S104, for example), the flow of water to the wash water system 11 may be stopped and each wash water panel assembly 21 that needs a new replacement spray membrane 25 can be moved to its open position. The old spray membrane 25 can then be removed and replaced with a new spray membrane 25. Once the new spray membrane is positioned for replacement of the old spray membrane, the wash water panel assembly 21 can be moved back to its closed position via motion of the outer panel body 24 via connectors 23. For embodiments of the wash water system 11 that utilize locking mechanisms, the locking mechanism for each wash water panel assembly 21 may be actuated to an unlocked position for permitting the wash water panel assembly 21 to be moved from its closed position to its open position. The lock mechanism can then be re-actuated into a locked position after the wash water panel assembly 21 is returned to its closed position to help keep the wash water panel assembly in its closed position 21 for operation of the wash water system 11. The wash water system may then be operated again to resume washing of the froth via water sprays 31 (as indicated in FIG. 9 by the arrow extending from exemplary step S105 to exemplary step S102).

The removal and replacement of spray membranes 25 can be performed for other reasons or in other type of maintenance procedures. For instance, spray membranes 25 can be replaced at pre-selected periodic intervals defined by an operator or may be removed and replaced with new and different spray membranes 25 that have different sets of spray holes 25*a* or different shaped recesses 25*b* to provide a different spray profile of water sprays 31 to meet a different desired operational parameter for directing sprays of water into the froth of a flotation machine tank 3. Such changes in spray membranes can be utilized, for example, if the flotation machines are to be changed for extraction of one type of mineral or ore to another type of mineral or ore or when a new spray profile that may be provided by new spray membranes 25 is determined to provide an improved operational performance for the flotation machine 1.

In yet other embodiments of the wash water system, it is contemplated that each wash water panel assembly 21 can include replaceable nozzles. The nozzles can be positioned in spray hole 25*a* or recess 25*b* of the spray membrane 25. The nozzles could be replaceably or removably positioned in the spray holes 25*a* or recesses 25*b* to allow the nozzles to be replaced with other nozzles so that different spray flow profiles could be provided without the spray membranes having to be removed or replaced for providing the different spray flow profiles. In other embodiments, the replaceable nozzles can be positionable in the holes 22*b* of the metering plate (e.g. removably attachable to the metering plate 22 or removably positionable within the holes 22*b* of the metering plate 22) to allow the nozzles to be replaced with other nozzles so that different spray flow profiles could be provided without the spray membranes having to be removed or replaced for providing the different spray flow profiles. For such replacement of nozzles, the wash water panel assemblies could be moved from their closed positions to open positions so that the nozzles could be manipulated by a user to remove and replace them. The wash water panel assemblies 21 could then be returned to their closed positions for subsequent operation.

It should be understood that different variations to the above mentioned embodiments of the flotation machine 1, wash water system 11, and wash water panel assemblies 21 may be made to meet different design objectives. For example, the tank 3 of the flotation machine 1 may have any of a number of shapes or sizes. For instance, the shape and geometry of the tanks of flotation cells may be any of a number of different shapes and sizes. The type of material to be recovered by a flotation machine may be any of a number of different minerals or metals such as, for example, copper, iron, coal, a base metal, a special metal, other minerals or other types of metal. As yet another example and as those of at least ordinary skill in the art will appreciate, the types of reagents, types of depressants/activators, use of different pH levels, use of different collectors, frothers, or modifiers may be utilized as needed to meet different material recovery objectives, or other design objectives. Of course, yet other modifications to the embodiments discussed above may be made to meet any of a number of design criteria that may be set or requested by a flotation machine operator for recovery of a material from a slurry retained within a tank of a flotation machine as may be appreciated by those of at least ordinary skill in the art.

As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain present preferred embodiments of a flotation machine, wash system for a flotation machine, panel assembly for a wash water system, and methods of making and using the same have been shown and described above, it is to be distinctly understood that the invention is not limited thereto but may be otherwise variously embodied and practiced within the scope of the following claims.

The invention claimed is:

1. A flotation machine (1) comprising:

a wash water system (11) that is connectable adjacent a tank (3) to direct sprays (31) of water into froth, the wash water system (11) comprising a plurality of wash water panel assemblies (21) positioned adjacent the tank (3), each of the wash water panel assemblies (21) being moveable between an open position and a closed position, each of the wash water panel assemblies (21) comprising:

an outer panel body (24) that at least partially defines a reservoir (24*b*) in which wash water is passable wherein the outer panel body (24) is moveably attachable to the tank (3) of the flotation machine via at least one connector (23) such that the outer panel body (24) of the panel assembly is moveable between an open position and a closed position; and a spray membrane (25) positionable adjacent the outer panel body (24), the spray membrane having a plurality of spray holes (25*a*) in fluid communication with the reservoir (24*b*) such that water is passable from the reservoir (24*b*) and through the spray membrane (25) via the spray holes (25*a*) for spraying water into the froth.

2. The flotation machine of claim 1, wherein the spray membrane (25) is resilient and is configured such that a plurality of protruding shapes (29) are formed in the spray membrane (25) via deformation of the spray membrane that occurs when liquid water is passed through the spray holes (25*a*) for spraying water into the froth.

3. The flotation machine of claim 2, wherein the spray membrane (25) has a plurality of recesses (25*b*), each of the recesses in fluid communication with a respective set of the spray holes (25*a*), each of the recesses (25*b*) also in fluid communication with the reservoir (24*b*).

4. The flotation machine of claim 3, wherein each of the wash water panel assemblies (21) comprise a metering plate (22) positioned between the outer panel body (24) and the spray membrane (25), the metering plate (22) having a plurality of holes (22*b*) in fluid communication with the reservoir (24*b*), each of the holes (22*b*) of the metering plate (22) being in fluid communication with at least one of the recesses (25*b*).

5. The flotation machine of claim 2, wherein each of the wash water panel assemblies (21) comprise a metering plate (22) positioned between the outer panel body (24) and the spray membrane (25), the metering plate (22) having a plurality of holes (22*b*) in fluid communication with the reservoir (24*b*), each of the holes (22*b*) of the metering plate (22) being in fluid communication with at least one of the spray holes (25*a*).

6. The flotation machine of claim 2, comprising:

at least one wash water member (27) positioned to contact the spray membrane (25) of at least one of the wash water panel assemblies (21) when that at least one wash water panel assembly (21) is in a closed position, the at least one wash water member (27) having holes (27*a*) that are aligned with the spray holes (25*a*) so that the protruding shapes (29) can extend into the holes (27*a*) of the at least one wash water member (27).

7. The flotation machine of claim 6, wherein the spray membrane (25) has a plurality of recesses (25*b*), each of the recesses (25*b*) in fluid communication with a respective set of the spray holes (25*a*), each of the recesses (25*b*) also in fluid communication with the reservoir (24*b*); and wherein each of the wash water panel assemblies (21) comprise a metering plate (22) positioned between the outer panel body (24) and the spray membrane (25), the metering plate (22) having a plurality of holes (22*b*) in fluid communication with the reservoir (24*b*), each of the holes (22*b*) of the metering plate (22) being in fluid communication with at least one of the recesses (25*b*).

8. The flotation machine of claim 6, wherein each of the wash water panel assemblies (21) comprise a metering plate (22) positioned between the outer panel body (24) and the spray membrane (25) to at least partially define the reservoir (24*b*), the metering plate (22) having a plurality of holes (22*b*) in fluid communication with the reservoir (24*b*), each of the holes (22*b*) of the metering plate (22) being in fluid communication with at least one of the spray holes (25*a*).

9. The flotation machine of claim 1, comprising:

a plurality of connectors (23) that moveably connect the wash water panel assemblies (21) to at least one of the tank and a housing of the flotation machine such that each of the wash water panel assemblies (21) is moveable between a closed position and an open position; and wherein the spray membrane (25) is resilient and is configured such that a plurality of protruding shapes (29) are formed in the spray membrane (25) when liquid water is passed through the spray holes (25*a*) for spraying water into the froth.

10. The flotation machine of claim 9, comprising:

at least one wash water member (27) positioned to contact the spray membrane (25) of at least one of the wash water panel assemblies (21) when that at least one wash water panel assembly (21) is in the closed position, the at least one wash water member (27) having holes (27*a*) that are aligned with the spray holes (25*a*) so that the protruding shapes (29) can extend into the holes (27*a*) of the at least one wash water member (27).

11. The flotation machine of claim 10, wherein the spray membrane (25) has a plurality of recesses (25*b*), each of the recesses (25*b*) in fluid communication with a respective set of the spray holes (25*a*), each of the recesses (25*b*) also in fluid communication with the reservoir (24*b*); and wherein each of the wash water panel assemblies (21) comprise a metering plate (22) positioned between the outer panel body (24) and the spray membrane (25), the metering plate having a plurality of holes (22*b*) in fluid communication with the reservoir (24*b*), each of the holes (22*b*) of the metering plate (22) being in fluid communication with at least one of the recesses (25*b*).

12. A wash water panel assembly (21) for a wash water system (11) of a flotation machine (1), the panel assembly (21) comprising: an outer panel body (24) that at least partially defines a reservoir (24*b*) in which wash water is passable; and a spray membrane (25) positionable adjacent the outer panel body (24), the spray membrane (25) having a plurality of spray holes (25*a*) in fluid communication with the reservoir (24*b*) such that water is passable from the reservoir (24*b*) and through the spray membrane (25) via the spray holes (25 *a*) for spraying water into froth; wherein the spray membrane (25) is resilient and is configured such that a plurality of protruding shapes (29) are formed in the spray membrane (25) when liquid water is passed through the spray holes (25*a*) for spraying water into the froth; and wherein the outer panel body (24) is moveably attachable to at least one of a tank (3) of the flotation machine and a housing (6) of the flotation machine via at least one connector (23) such that the outer panel body (24) is moveable between an open position and a closed position.

13. A method of operating a flotation machine (1) comprising: providing a wash water system (11) including wash water panel assemblies according to claim 12 for installation into a flotation machine adjacent a top portion of a tank (3) for directing sprays (31) of liquid water into a froth zone of froth formed in the tank (3); and at least one of: moving wash water panel assemblies (21) between closed positions and open positions to replace spray membranes (25) of the wash water panel assemblies (21) of the wash water system (11), and feeding water into wash water panel assemblies (21) of the wash water system (11) so that spray membranes (25) of the wash water panel assemblies (21) having spray holes (25*a*) form protruding shapes (29) as water is sprayed out of the spray holes (25*a*) and into the froth zone.

14. The method of claim 13, comprising both of: the moving wash water panel assemblies (21) between closed positions and open positions to replace spray membranes (25) of the wash water panel assemblies (21) of the wash water system (11), and the feeding water into wash water panel assemblies (21) of the wash water system (11) so that spray membranes (25) of the wash water panel assemblies (21) having spray holes (25*a*) form protruding shapes (29) as water is sprayed out of the spray holes (25*a*) and into the froth zone.

15. The method of claim 13, comprising: performing at least one cleaning cycle such that water is passed out of the spray holes (25*a*) of the spray membranes (25) at a cleaning flow rate that is greater than a first flow rate at which water is passed out of the spray holes (25*a*) for a preselected period of time.

* * * * *